(12) United States Patent
Kyeong et al.

(10) Patent No.: US 11,269,736 B2
(45) Date of Patent: Mar. 8, 2022

(54) METHOD TO MANAGE DATABASE FAILURE

(71) Applicant: TmaxData Co., Ltd., Gyeonggi-do (KR)

(72) Inventors: Kiryong Kyeong, Gyeonggi-do (KR);
Wanho Kim, Gyeonggi-do (KR);
Dongjae Lee, Sejong-si (KR); Stellar Heo, Gyeonggi-do (KR)

(73) Assignee: TMAX DATA CO., LTD., Gyeonggi-Do (KR)

( * ) Notice: Subject to any disclaimer, the term of this patent is extended or adjusted under 35 U.S.C. 154(b) by 81 days.

(21) Appl. No.: 16/445,054

(22) Filed: Jun. 18, 2019

(65) Prior Publication Data

US 2020/0341863 A1     Oct. 29, 2020

(30) Foreign Application Priority Data

Apr. 24, 2019   (KR) .......................... 10-2019-0047752

(51) Int. Cl.
*G06F 11/14* (2006.01)
*G06F 11/07* (2006.01)

(52) U.S. Cl.
CPC ...... *G06F 11/1466* (2013.01); *G06F 11/0706* (2013.01); *G06F 2201/80* (2013.01); *G06F 2201/82* (2013.01)

(58) Field of Classification Search
CPC ............. G06F 11/1466; G06F 11/0706; G06F 2201/82; G06F 2201/80; G06F 11/203

(Continued)

(56) References Cited

U.S. PATENT DOCUMENTS 10,305,955 B1 *   5/2019   Li .................... H04L 65/4084
2004/0111286 A1 * 6/2004   Koenig ............... G06Q 20/203
                                                      705/22

(Continued)

FOREIGN PATENT DOCUMENTS

| KR | 1020090005367 A | 1/2009 |
| KR | 20190032694 A | 3/2019 |
| WO | 2002021276 A1 | 3/2002 |

OTHER PUBLICATIONS

Office Action issued for Korean Patent Application No. 10-2019-0047752 dated Aug. 27, 2020; 4 pgs.

*Primary Examiner* — Yair Leibovich
(74) *Attorney, Agent, or Firm* — Umberg Zipser LLP; Ryan Dean

(57) ABSTRACT

Disclosed is a non-transitory computer readable medium storing a computer program. When the computer program is executed by one or more processors of a computing device, the computer program performs procedures for database failure management, and the procedures may include: receiving backend failure information for at least one backend of one or more backends; receiving an event from a client after receiving the backend failure information; verifying whether the event is an event corresponding to a failed backend; verifying a type of the event if the event is an event corresponding to a failed backend; determining a method of processing the event corresponding to the failed backend based on the type of event, while backend failure occurs; receiving recovery information about the failed backend; and processing an event received from the client after receiving the recovery information about the backend.

15 Claims, 6 Drawing Sheets

(58) Field of Classification Search
USPC ............................................................ 714/3
See application file for complete search history.

(56) References Cited

U.S. PATENT DOCUMENTS

| | | |
|---|---|---|
| 2004/0205110 A1 | 10/2004 | Hinshaw |
| 2006/0015542 A1 | 1/2006 | Pommerenk et al. |
| 2007/0168874 A1* | 7/2007 | Kloeffer .................. G06F 8/65 715/764 |
| 2007/0261063 A1 | 11/2007 | Matousek et al. |

* cited by examiner

METHOD TO MANAGE DATABASE FAILURE

CROSS-REFERENCE TO RELATED APPLICATIONS

This application claims priority to and the benefit of Korean Patent Application No. 10-2019-0047752 filed in the Korean Intellectual Property Office on Apr. 24, 2019, the entire contents of which are incorporated herein by reference.

TECHNICAL FIELD

The present disclosure relates to a method for processing an event in a database, and more particularly, to a method of processing an event when a failure occurs in a database.

BACKGROUND ART

Businesses of enterprises are rapidly expanding with explosive data growth and the emergence of diverse environments and platforms. As new business environments emerge, more efficient and flexible data services and information processing, and data management functions are needed. In response to these changes, a research is continued on databases to solve problems of high performance, high availability, and scalability which are foundations of corporate business implementation.

In a database management system (DBMS), data may be stored in a data storage. When the database includes a large amount of data, it may take a relatively long time to process a query to retrieve data in which a user is interested. When it takes a long time for the database to respond to the query, it may adversely affect performance of the database.

A plurality of execution plans may be considered in connection with a manner in which the query (or event) issued from the client is processed. Since the respective execution plans have different properties, it is necessary to determine an algorithm most suitable for processing the corresponding query before processing the corresponding query. In this case, when a failure occurs in some objects of the database required for processing the query, an execution plan for processing the query needs to be considered. When the failure occurs in at least some objects of the database, there is a need in the art to efficiently process the query received from the client.

Korean Patent Unexamined Publication No. 2019-0032694 discloses a method for designing a database using a hierarchical structure.

SUMMARY OF THE INVENTION

The present disclosure has been made in an effort to provide a method to manage a database failure.

An exemplary embodiment of the present disclosure provides a non-transitory computer readable medium storing a computer program in which when the computer program is executed by one or more processors of a computing device, the computer program performs procedures for database failure management, and the procedures may include: receiving backend failure information for at least one backend of one or more backends; receiving an event from a client after receiving the backend failure information; verifying whether the event is an event corresponding to a failed backend; verifying a type of the event if the event is an event corresponding to a failed backend; determining a method of processing the event corresponding to the failed backend based on the type of the event, while backend failure occurs; receiving recovery information about the failed backend; and processing an event received from the client after receiving the recovery information about the backend.

In an alternative exemplary embodiment of the procedures of the computer program which performs the following procedures for database failure management, the types of event may include a streaming event for storing data or a read event for reading data included in a backend.

In an alternative exemplary embodiment of the procedures of the computer program which performs the following procedures for database failure management, if the type of event is a streaming event, the determining of a method of processing the event corresponding to the failed backend based on the type of the event, while backend failure occurs, may include determining to store a data based on the event in a physical storage space and the procedures may further include transmitting a data based on the event stored in the physical storage space to a recovered backend after recovery of the failed backend.

In an alternative exemplary embodiment of the procedures of the computer program which performs the following procedures for database failure management, if the type of event is a read event, the determining of a method of processing the event corresponding to the failed backend based on the type of the event, while backend failure occurs, may include determining to stop at least one of transmission or conversion of a data based on the read event.

In an alternative exemplary embodiment of the procedures of the computer program which performs the following procedures for database failure management, the processing of an event received from the client after receiving the recovery information about the failed backend may include establishing a connection with at least one backend of the one or more backends.

In an alternative exemplary embodiment of the procedures of the computer program which performs the following procedures for database failure management, the procedures may further include: transmitting a data load request information to at least one backend of the one or more backends based on the event received from the client; storing at least one of the data load request information or information about at least one backend that has received the data load request in a buffer; and if a process completion information is received based on the data load request information from at least one backend that has received the data load request information, deleting at least one of the data load request information or information about at least one backend that transmits a data load request from the buffer.

Another exemplary embodiment of the present disclosure provides a non-transitory computer readable medium storing a computer program, wherein when the computer program is executed by one or more processors of a computing device, the computer program performs procedures for database failure management, and the procedures may include: receiving a frontend list including information about one or more frontends from a frontend of one or more frontends; establishing a connection with another frontend other than a failed frontend based on the frontend list, if at least one frontend of the one or more frontends is failed; establishing a connection with at least one backend of one or more backends based on a connection with the other frontend; and determining a method of processing an event received from a client since at the time when at least one frontend is failed until when connection with at least one of the one or more backends is established, while frontend failure occurs.

In an alternative exemplary embodiment of the procedures of the computer program which performs the following procedures for database failure management, the determining of a method of processing an event received from a client since at the time when at least one frontend is failed until when connection with at least one of the one or more backends is established, while frontend failure occurs, may include determining to store a data based on the event in a physical storage space, if a type of event is a streaming event.

In an alternative exemplary embodiment of the procedures of the computer program which performs the following procedures for database failure management, the procedures may further include transmitting the data based on the event stored in the physical storage space to a backend in which the event is to be processed, after establishing the connection with at least one backend of the one or more backends.

In an alternative exemplary embodiment of the procedures of the computer program which performs the following procedures for database failure management, the procedures may further include determining to perform the processing for a read event again after establishing a connection with at least one backend of the one or more backends, if a type of event is the read event for reading data included in at least one backend of the one or more backends.

In an alternative exemplary embodiment of the procedures of the computer program which performs the following procedures for database failure management, the determining to perform the processing for a read event again after establishing a connection with at least one of the one or more backends may include determining to perform processing for the read event based on a data after a last storage time of the one or more backends.

Yet another exemplary embodiment of the present disclosure provides a method for database failure management may include: receiving backend failure information for at least one of one or more backends; receiving an event from a client after receiving the backend failure information; verifying whether the event is an event corresponding to a failed backend; verifying a type of event if the event is an event corresponding to a failed backend; determining a method of processing the event corresponding to the failed backend based on the type of event, while backend failure occurs; receiving recovery information about the failed backend; and processing an event received from the client after receiving the recovery information about the failed backend.

Still yet another exemplary embodiment of the present disclosure provides a server for database failure management may include: a processor including one or more cores; and a memory, in which the processor may be configured to receive backend failure information for at least one of a one or more backends; receive an event from a client after receiving the backend failure information; verify whether the event is an event corresponding to a failed backend; verify a type of event if the event is an event corresponding to a failed backend; determine a method of processing the event corresponding to the failed backend based on the type of event, while backend failure occurs; receive recovery information about the failed backend; and process an event received from the client after receiving the recovery information about the failed backend.

Still yet another exemplary embodiment of the present disclosure provides a method for database failure management may include: receiving a frontend list including information about one or more frontends from one frontend of one or more frontends; establishing a connection with another frontend other than a failed frontend based on the frontend list, if at least one frontend of the one or more frontends is failed; establishing a connection with at least one backend of one or more backends based on a connection with the other frontend; and determining a method of processing an event received from a client since at the time when at least one frontend is failed until when connection with at least one of the one or more backends is established, while frontend failure occurs.

Still yet another exemplary embodiment of the present disclosure provides a server for database failure management may include: a processor including one or more cores; and a memory, in which the processor may be configured to receive a frontend list including information about one or more frontends from one frontend of one or more frontends; establish a connection with another frontend other than a failed frontend based on the frontend list, if at least one frontend of the one or more frontends is failed; establish a connection with at least one backend of one or more backends based on a connection with the other frontend; and determine a method of processing an event received from a client since at the time when at least one frontend is failed until when connection with at least one of the one or more backends is established, while frontend failure occurs.

According to an exemplary embodiment of the present disclosure, a method to manage a database failure can be provided.

BRIEF DESCRIPTION OF THE DRAWINGS

Various aspects are now described with reference to the drawings and like reference numerals are generally used to designate like elements. In the following exemplary embodiments, for the purpose of description, multiple specific detailed matters are presented to provide general understanding of one or more aspects. However, it will be apparent that the aspect(s) can be executed without the detailed matters.

DETAILED DESCRIPTION

Figure 1:
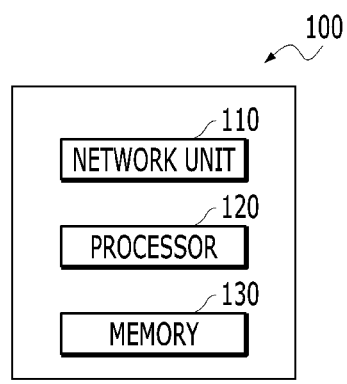
FIG. 1 is a block diagram of a hyper loader performing an operation for managing a database failure according to an exemplary embodiment of the present disclosure.

Various exemplary embodiments will now be described with reference to drawings. In the present specification, various descriptions are presented to provide appreciation of the present disclosure. However, it is apparent that the embodiments can be executed without the specific description.

"Component", "module", "system", and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

Moreover, the term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to all of the case where X uses A, the case where X uses B, or the case where X uses both A and B. Further, it should be understood that the term "and/or" used in the specification designates and includes all available combinations of one or more items among enumerated related items.

Further, it should be appreciated that the term "comprise" and/or "comprising" means that presence of corresponding features and/or components. However, it should be appreciated that the term "comprises" and/or "comprising" means that presence or addition of one or more other features, components, and/or a group thereof is not excluded. Further, when not separately specified or not clear in terms of the context that a singular form is indicated, it should be construed that the singular form generally means "one or more" in the present specification and the claims.

Those skilled in the art need to recognize that various illustrative logical blocks, configurations, modules, circuits, means, logic, and algorithm steps described in connection with the exemplary embodiments disclosed herein may be implemented as electronic hardware, computer software, or combinations of both sides. To clearly illustrate the interchangeability of hardware and software, various illustrative components, blocks, structures, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

In an exemplary embodiment of the present disclosure, a server may include other components for performing a server environment of the server. The server may include all arbitrary types of devices. The server as a digital device may be a digital device with a calculation capability, which has a processor installed therein and a memory, such as a laptop computer, a notebook computer, a desktop computer, a web pad, or a mobile phone. The server may be a web server that processes a service. A type of server described above is just an example and the present disclosure is not limited thereto.

FIG. 1 is a block diagram of a hyper loader 100 performing an operation for managing a database failure according to an exemplary embodiment of the present disclosure.

The hyper loader 100 for managing an event in a database failure according to an exemplary embodiment of the present disclosure may include a network unit 110, a processor 120, and a memory 130.

The network unit 110 may transmit and receive an event or data according to an exemplary embodiment of the present disclosure to and from other computing devices, servers, and the like. The network unit 110 may transmit and receive the event or data to and from a client (agent) 400, a backend 200, a frontend 300, etc.

The processor 120 may be constituted by one or more cores and may include processors for managing the database failure, which include a thread, a central processing unit (CPU) of the computing device, a general purpose graphics processing unit (GPGPU), a tensor processing unit (TPU), and the like. The processor 120 may read a computer program stored in the memory 130 to manage the event in the database failure according to an exemplary embodiment of the present disclosure. According to an exemplary embodiment of the present disclosure, the processor 120 may perform a calculation for managing the event in the database failure.

The memory 130 may store a computer program for managing the event in the database failure according to an exemplary embodiment of the present disclosure and the stored computer program may be read and driven by the processor 120.

The memory 130 according to the exemplary embodiments of the present disclosure may store a program for a motion of the processor 120 and temporarily or permanently store input/output data or events. The memory 130 may store data regarding the display and the sound. The memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

Figure 2:
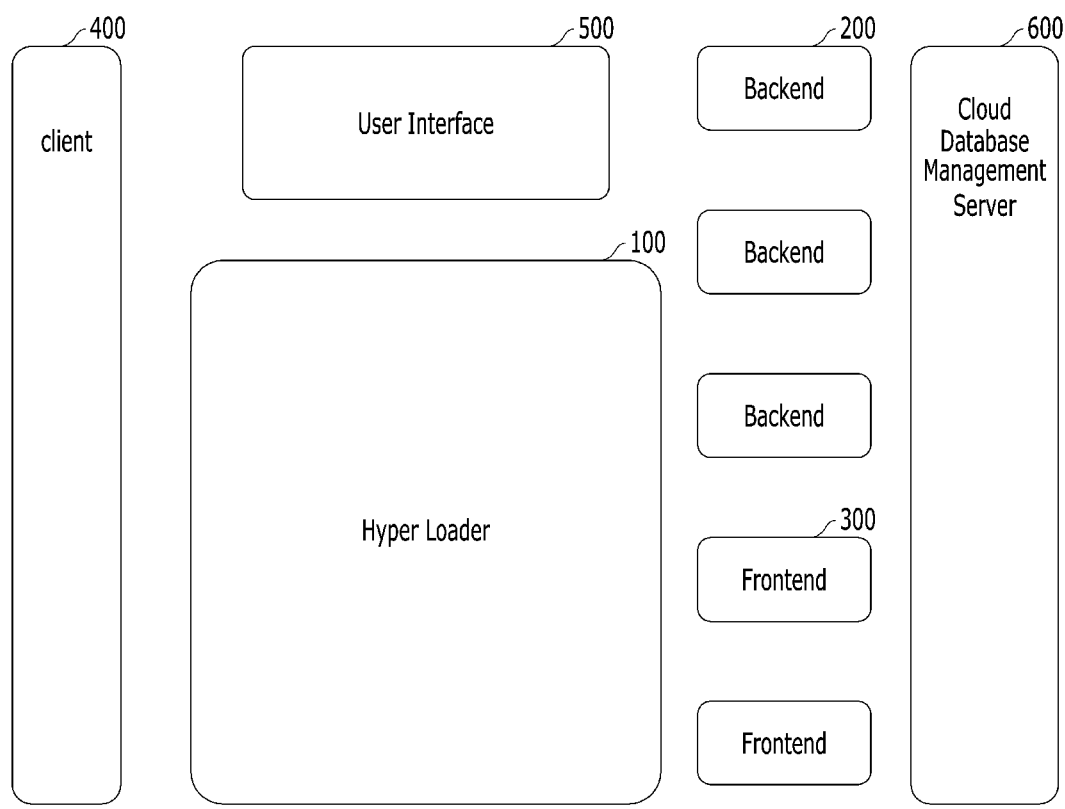
FIG. 2 is a diagram illustrating an example of a system according to an exemplary embodiment of the present disclosure.

Hereinafter, a system including the hyper loader will be described with reference to FIG. 2. FIG. 2 is a diagram illustrating an example of a system according to an exemplary embodiment of the present disclosure.

A database management system may include a hyper loader 100, a backend 200, a frontend 300, a client 400, a user interface 500, and a cloud database management server

600. Each of the objects of the system may be constituted as computing devices. The system may be configured based on cloud computing.

The hyper loader 100 may process an event received from the client 400 using at least one of the backend 200 and the frontend 300.

The hyper loader 100 may transmit and receive data to and from another computing device in order to process the event received from the client 400. The hyper loader 100 may transform the event or store information related to the event in order to process the event received from the client 400. The hyper loader 100 may wait for receiving information on the event even at an idle time when the event is not received. That is, an event manager 170 may continuously wait in a state in which the event manager 170 is capable of receiving the event.

The hyper loader 100 may store the information related to the event. For example, the hyper loader 100 may store information regarding the event, data information acquired by transforming the event, information regarding a backend for processing the event, and the like. For example, the hyper loader 100 may store information regarding a data read/write request based on the event in the hyper loader 100 before transmitting the data read/write request based on the event to the backend 200 and when receiving from the backend 200 processing completion information for the requested data read/write request, the hyper loader 100 may delete information regarding the stored data read/write request. The concrete description of the hyper loader 100 is just an example and the present disclosure is not limited thereto.

The hyper loader 100 may perform transformation of the event before transmitting the data read/write request based on the event to the backend 200. Transformation of the event performed by the hyper loader 100 may mean transforming the event received from the client 400 to a format which may be processed by the backend 200 or the frontend 300.

The backend 200 may be a storage storing data. For example, when the event is a streaming event for storing the data in the database, the backend 200 may store data in the database based on the data write request received from the hyper loader 100. For example, when the event is a read event for reading data from the database, the backend 200 may read data from the database based on the data read request received from the hyper loader 100 and transmit the read data to the hyper loader 100. The concrete description of the backend 200 is just an example and the present disclosure is not limited thereto.

The system may include one or more backends 200. One or more respective backends 200 may store different data or may contain the same data. For example, when data is distributed and stored, two or more back-ends 200 may store different data, respectively. Further, for example, the system may include a mirroring backend against a case where the backend 200 is failed or the data of the backend 200 is lost, and as a result, integrity is broken. In this case, the mirroring backend may store the same data as the backend 200 to be mirrored. The concrete description of the two or more backends is just an example and the present disclosure is not limited thereto.

The frontend 300 may generate an execution plan for processing the event. The frontend 300 may generate an execution plan for processing the event based on an address on a network of the backend or the frontend included in a cloud database management server 600 and an address of data that may be stored in the frontend or the backend. A plan for processing the event may be an execution plan based a location of the backend 200 storing or to store data for processing the event. The concrete description of the frontend is just an example and the present disclosure is not limited thereto.

The system may include one or more frontends 300. When one frontend connected with the hyper loader 100 is failed among one or more frontends 300, another frontend may be connected with the hyper loader 100 instead of the failed frontend.

The client 400 may request the hyper loader 100 to load data. The client 400 transmits the event to the hyper loader 100 to load data to read or write data from the database. For example, when the client 400 is a banker terminal, the client 400 may transmit the read event for verifying a balance of a customer account stored in the database to the hyper loader 100. For example, when the client 400 is an artificial intelligent speaker, the client 400 may transmit to the hyper loader 100 the streaming event for storing information which a speaker user requests to the speaker through a voice in the database.

The user interface 500 may provide an interface for managing the hyper loader 100 by a user who uses the database management system. The user may verify the event or data being processed by the hyper loader 100 or a usage amount of the memory 130 of the hyper loader 100 through the user interface 500. The user may manage the hyper loader 100 through the user interface 500. For example, the user may limit a capacity of the memory 130 used in the hyper loader 100 or modify a processing method of the event using the user interface 500. The concrete description of the user interface is just an example and the present disclosure is not limited thereto.

The cloud database management server 600 may manage at least one of the frontend 300 and the backend 200. The cloud database management server 600 may store an address on the network of the frontend 300 or the backend 200 and an address of data that may be stored on the frontend 300 or the backend 200. The cloud database management server 600 may store a frontend list and a backend list. The cloud database management server 600 may store manage metadata for the frontend and the backend. The frontend 300 may generate the execution plan for the event based on the information stored in the cloud database management server 600. The cloud database management server 600 may store the metadata based on the data stored in the backend 200. The concrete description of the cloud database management server is just an example and the present disclosure is not limited thereto.

Hereinafter, a method for processing the event received from the client 400 using the hyper loader 100 will be described. The event may be processed by a conventional path or a direct path. The conventional path and the direct path will be described below.

The event received from the client 400 may be processed through the backend 200 via the frontend 300. The conventional path may be a method of processing the event via the frontend 300. The hyper loader 100 may transmit the event received from the client 400 to the frontend 300. The frontend 300 may generate the execution plan for processing the event based on the event received from the hyper loader 100. The execution plan generated by the frontend 300 may be a plan generated based on the metadata stored in the cloud database management server 600. The execution plan may include a plan for processing the event and may include, for example, backend information to be accessed to process the event. The execution plan may include information regarding which backend of one or more of the backends 200 is to access which table in order to process the event. The frontend 300 may transmit the generated execution plan to the hyper loader 100. The hyper loader 100 may transmit an event-based data read/write request to the backend 200 to be accessed in order to process the event based on the execution plan received from the frontend 300. When the event is the read event, the hyper loader 100 may transmit the data read request based on the read event to the backend 200 storing required data based on the read event. When the event is the streaming event, the hyper loader 100 may request the backend 200 for storing data to store data based on the streaming event based on the streaming event. The concrete description of the conventional path is just an example and the present disclosure is not limited thereto.

The event received from the client 400 by the hyper loader 100 may be processed through the backend 200 immediately without passing through the frontend 300. The direct path may be a method of processing the event through the backend 200 immediately without passing through the frontend 300. For the direct path, it may be necessary to pass through a prepare process with the frontend 200.

Hereinafter, an operation of preparing for event processing based on the direct path method in the hyper loader 100 will be described.

The hyper loader 100 may request the frontend list and the backend list to the frontend 300 in order to prepare for the event processing based on the direct path method. The hyper loader 100 may receive the frontend list and the backend list from the frontend 300 based on the request.

The frontend list may include information regarding one or more frontends. The information regarding one or more frontends may include information regarding another frontend that may perform a task in place of the frontend where the failure occurs when the failure occurs in one frontend. Information regarding other frontend that may perform the task in place of the frontend where the failure occurs may be information regarding the mirroring frontend for the frontend where the failure occurs. The mirroring frontend may be a frontend which stores the same data against a case where one frontend is to be failed. Further, the information regarding another frontend that may perform the task in place of the frontend where the failure occurs may be information regarding a frontend that performs another task.

The backend list may include information regarding one or more backends. The backend list may include addresses for one or more backends. Further, the backend list may include information regarding data included in the backend. The information regarding the data included in the backend may include information on a table, a column, etc., which include data. For example, the backend list may include information regarding which table is stored in which backend. The hyper loader 100 may receive the backend list from the frontend 300 and process the event by the direct path based on the received backend list.

The hyper loader 100 may establish a connection with one or more backends based on the received backend list. The hyper loader 100 may establish a connection with one or more backends based on the addresses for one or more backends included in the received backend list. The hyper loader 100 may process the event by the direct path based on the connection between the hyper loader 100 and the backend 200. When receiving the event, the hyper loader 100 may load data to the backend 200 without passing through the frontend 300 based on the connection.

Hereinafter, an operation for processing the event based on the direct path method in the hyper loader 100 will be described. Specifically, an operation of processing the event received from the client 400 by using the direct path method by the hyper loader 100 will be described.

The hyper loader 100 may receive the event from the client 400. The hyper loader 100 may transform the event to a format which may be processed by the backend 200.

The hyper loader 100 may store information regarding the transformed event. The hyper loader 100 may store the information regarding the data read/write request before transmitting the data read/write request to the backend 200. The hyper loader 100 may store the information regarding the data read/write request and the information regarding the backend for processing the data read/write request. The hyper loader 100 may transmit the data read/write request to one or more backends 200. The hyper loader 100 may keep storing the information regarding the data read/write request and the information regarding the backend for processing the data read/write request without deleting the information regarding the data read/write request and the information regarding the backend for processing the data read/write request until receiving the processing completion information from one or more backends 200 transmitting the data read/write request.

The hyper loader 100 may identify the backend 200 where which the event received from the client 400 needs to be processed based on the backend list and transmit the data read/write request information to the backend 200 immediately using the connection established through the prepare process without passing through the process of generating the execution plan in the frontend 300. The hyper loader 100 may generate the data read/write request to be transmitted to the backend 200 based on the transformation of the event received from the client 400.

The backend 200 may read/write data to the backend 200 based on the received data read/write request. The backend 200 may transmit the processing completion information to the hyper loader 100 that the reading/writing is completed based on the data read/write request after completing execution of the task based on the received data read/write request.

The hyper loader 100 may receive the processing completion information for the data read/write request from one or more backends 200 that transmit the data read/write request. When the hyper loader 100 receives the processing completion information for the data read or write request, the hyper loader 100 may delete the information regarding the stored read/write request to correspond to the backend 200 transmitting the processing completion information and the information regarding the backend for processing the data read/write request.

The hyper loader 100 may transmit the information based on the read/write request to the client 400 when necessary based on the reception of the processing completion information from the backend 200. The hyper loader 100 may transmit to the client 400 the information regarding the data read based on the read event. The hyper loader 100 may transmit to the client 400 the information regarding the data written based on the streaming event.

Hereinafter, an operation of storing changed data of the backend 200 when data is changed in the backend 200 when processing the event based on the direct path method will be described.

The hyper loader 100 may transmit to the frontend 300 a storage request for the changed data of the backend 200. The hyper loader 100 may transmit the storage request for the changed data of the backend 200 in a predetermined time period to the frontend 300 or may transmit the storage request for the changed data of the backend 200 when data is changed a predetermined number of times in the backend

200, but this is just an example and the present disclosure is not limited thereto. The frontend 300 may transmit the storage request for the changed data of the backend 200 based on the storage request for the received changed data of the backend 200. The backend 200 may receive from the frontend 300 the storage request for the changed data. The backend 200 may store the changed data based on the storage request for the changed data received from the frontend 300. The backend 200 may transmit to the frontend 300 storage completion information for the changed data after completing storing the changed data. The frontend 300 may transmit to the frontend 300 the storage completion information for the changed data of the backend 200 based on the reception of the storage completion information for the changed data from the backend 200.

Since the direct path loads data on the backend immediately without passing through the frontend, when another user inquires data through the frontend, another user may not inquire the changed data in the backend. For example, another user may not perform an operation such as sending a select statement through the frontend because the data of the backend is not changed through the frontend when data is changed in the backend. When the hyper loader transmits the storage request for the changed data of the backend to the backend through the frontend, the frontend may inquire the changed data of the backend. When the changed data of the backend is stored through the frontend, the backend and the frontend may store information regarding the changed data even though the hyper loader is failed.

According to an exemplary embodiment of the present disclosure, the hyper loader 100 may transmit to the frontend 300 the storage request for the changed data of the backend 200 at a predetermined period. For example, the hyper loader 100 may transmit to the frontend 300 a storage request for the changed data of the backend 200 every n seconds. According to another exemplary embodiment of the present disclosure, the hyper loader 100 may transmit the storage request for the changed data of the backend 200 to the frontend 300 based on a predetermined data change degree. For example, the hyper loader 100 may transmit to the frontend 300 the storage request for the changed data of the backend 200 whenever a size of the changed data of the backend 200 becomes n bytes. The concrete description of the storage request of the backend is just an example and the present disclosure is not limited thereto.

In the case of the event processing in the related art, when the failure occurs in at least one computing device among two or more computing devices processing the event, all of tasks being performed by other computing devices are also failed. Further, when the failure occurs in at least one computing device among two or more computing devices in the middle of processing the event, there is a problem that all tasks are rolled back and the processing of the event needs to be performed again at the beginning. When the processing of the event is performed based on the method for processing event when the frontend is failed or the method for processing the event when the backend is failed according the present disclosure, even though the failure occurs in at least one computing device in the middle of processing the event, other computing devices are capable of processing the corresponding event and all tasks may be prevented from being rolled back.

Figure 3:
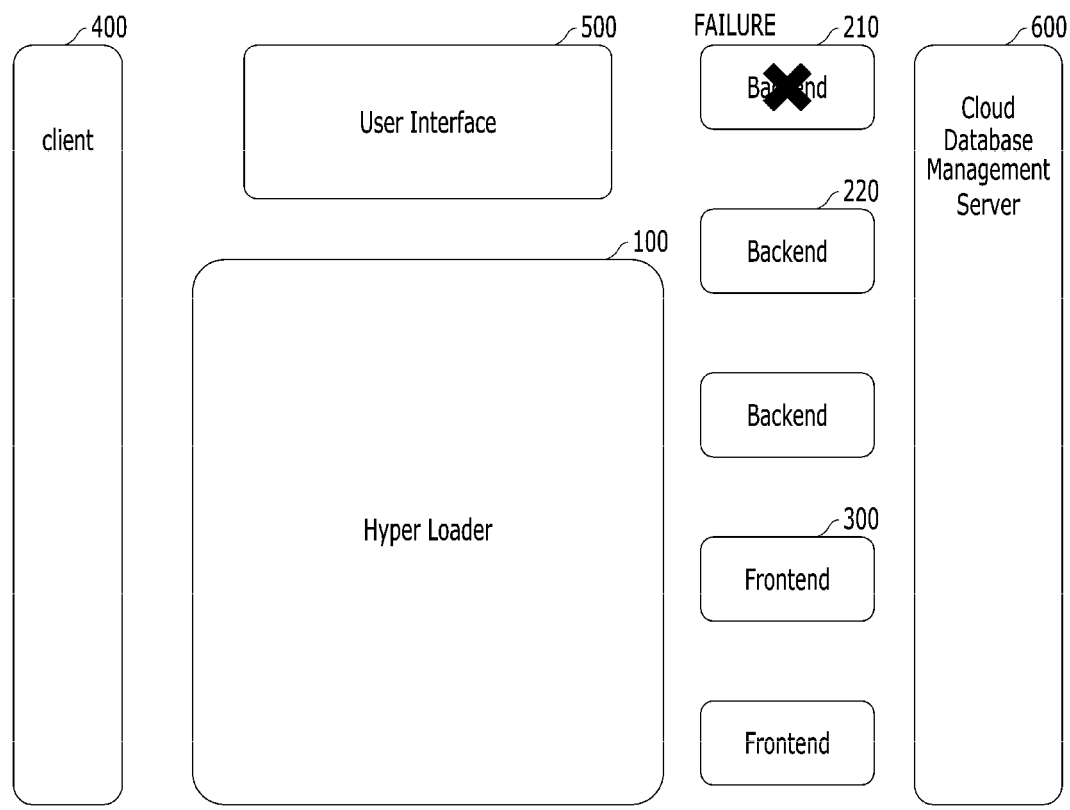
FIG. 3 is a diagram illustrating an example of a system in a failure of a backend according to an exemplary embodiment of the present disclosure.

Hereinafter, an operation of the hyper loader 100 for processing the event in the failure of a backend 210 will be described with reference to FIG. 3.

When only the backend 210 is failed among two or more computing devices for processing the event, the client 400 transmitting the event and the hyper loader 100 processing the event may not be failed but perform normal tasks. Hereinafter, a method for processing the event by using the hyper load 100 when the backend 210 is failed will be described.

The processor 120 may receive backend failure information for at least one backend 210 among one or more backends through the network unit 110. The processor 120 may receive the backend failure information from a frontend 300 through the network unit 110 even though the backend 210 is failed. When the backend 210 is failed, the cloud database management server 600 may detect the failure and transmit the backend failure information to the frontend 300. The frontend 300 may transmit the backend failure information to the processor 120 based on the backend failure information received from the cloud database management server 600. The backend failure information may include information regarding the failed backend 210. The information regarding the failed backend 210 may include the address of the failed backend 210.

The processor 120 may receive the event from the client 400 via the network unit 110 after receiving the backend failure information. When the processor 120 receives the event from the client 400 through the network unit 110, the processor 120 may determine one or more backends 200 for processing the received event. The processor 120 may identify the backend 200 for processing the event based on the backend list received from the frontend 300 in the preparation step for event processing. The processor 120 may identify the address of the backend 200 for processing the event. For example, when the event is a read event for reading data A and B stored in the backend 200, the processor 120 may identify a first backend and a second backend stored in data A and B, respectively based on the backend list. The concrete description of the processing of the event is just an example and the present disclosure is not limited thereto.

The processor 120 may verify whether the event is an event corresponding to the failed backend 210. The processor 120 may identify one or more backends 200 for processing the event based on the backend list received from the frontend 300. The processor 120 may identify whether there is a backend corresponding to the failed backend 210 of the one or more identified backends 200. When there is no failed backend 210 among one or more backends 200 identified based on the event, the processing of the event is irrespective to the failure of the backend 210, and as a result, the processing of the event may be performed based on unfailed backends 200. When there is the failed backend 210 among one or more backends 200 identified based on the event, the processing of the event may be performed by the processing while the failure of the backend occurs.

Hereinafter, the processing while the failure of the backend occurs for the event when there is the failed backend 210 among one or more backends 200 identified based on the event will be described.

The processor 120 may verify the type of event when the event is the event corresponding to the failed backend 210. The type of event may include the streaming event for writing data or a read event for reading data included in the backend.

The streaming event may be an event for writing data to the backend. For example, when the client 400 is a smart cleaner, a streaming event for requesting streaming data for a location currently cleaned by the smart cleaner to be stored may be transmitted to the processor 120 through the network unit 110. The streaming event may be transmitted from the client 400 to the processor 120 through the network unit 110 whenever the location of the smart cleaner is changed and when data based on the streaming event is not immediately stored, the data may be lost. The concrete description of the streaming event is just an example and the present disclosure is not limited thereto.

The read event may be an event for reading the data stored in the backend. For example, when the client 400 is the bank terminal, when an account balance of a customer is checked, a read event for requesting reading the data from the backend storing the data regarding the account balance may be transmitted to the processor 120 through the network unit 110. The concrete description of the read event is just an example and the present disclosure is not limited thereto.

The method for processing the event in the failure of the backend by the processor 120 may vary depending on the type of event. The processor 120 may determine the method for processing the event corresponding to the failed backend while the failure of the backend occurs based on the type of event.

Hereinafter, a method for processing a streaming event received after the failure of the backend 210 while the failure of the backend occurs by the processor 120 will be described.

When the type of event is the streaming event, an operation of determining the event processing method while the failure of the backend of the event occurs by the processor 120 may include an operation of determining to store the data based on the event in a physical storage space. The processor 120 may store the data based on the event corresponding to the failed backend 210 in the physical storage space. The physical storage space may include, for example, a disk. The concrete description of the physical storage space is just an example and the present disclosure is not limited thereto.

The processor 120 may receive from the frontend 300 recovery information indicating that the failed backend 210 is recovered. The cloud database management server 600 may detect the recovery for the failed backend 210 and transmit backend recovery information for the failed backend 210 to the frontend 300. The frontend 300 may transmit the recovery information for the failed backend 210 to the processor 120 through the network unit 110 based on the backend recovery information for the failed backend 210, which is received from the cloud database management server 600. The recovery information for the failed backend 210 may include information regarding the recovered backend 210. The recovery information for the failed backend 210 may include the address of the recovered backend 210. When there are two or more failed backends, the processor 120 may identify which backend is recovered based on the recovery information for the failed backend.

The processor 120 may transmit the data based on the event stored in the physical storage space to the recovered backend after recovery of the failed backend 210 via the network unit 110. The processor 120 may receive the recovery information of the failed backend through the network unit 110 and identify which backend is recovered. The processor 120 may identify data corresponding to the recovered backend among one or more data stored in the physical storage space. The processor 120 may transmit data identified to correspond to the recovered backend to the recovered backend through the network unit 110.

The processor 120 may transmit the data identified to correspond to the recovered backend stored in the physical storage space to the recovered backend through the network unit 110 at a predetermined time after the recovery of the backend. The predetermined time may be, for example, a time zone in which a frequency of use of the database is low. For example, the processor 120 may transmit the data based on the event stored in the physical storage space to the recovered backend through the network unit 110 at an early morning time in which a read/write frequency of the data included in the database is low. For example, the data based on the event stored in the physical storage space may be transmitted to the recovered backend within a predetermined time interval after the recovery of the backend. The concrete description of the transmission of the data to the recovered backend is just an example and the present disclosure is not limited thereto.

Hereinafter, a method for processing the streaming event while the failure of the backend occurs when the backend is failed while the streaming event is processed by the processor 120 will be described.

The processor 120 may identify one or more backends 200 for processing the streaming event when receiving the streaming event. The processor 120 may store in the memory 130 information regarding the streaming event and one or more backends for processing the streaming event. The processor 120 may store the information based on the streaming event in the memory 130 and then, transmit a request based on the data to one or more backends 200 for processing the streaming event through the network unit 110.

After the processor 120 transmits the data write request based on the streaming event to one or more backends via the network unit 110, the processor 120 may receive from the frontend 300 backend failure information for at least one backend among the one or more backends 200. The processor 120 may not receive the processing completion information for the data write request from the failed backend 210 as the backend 210 is failed. Since the processor 120 may not receive the processing completion information for the data write request, the processor 120 may not delete the information related to the streaming event from the memory 130. Accordingly, the memory 130 may continue to store information regarding the streaming event when the backend 210 is failed during the processing of the streaming event.

The processor 120 may determine to store the data based on the streaming event stored in the memory 130 in the physical storage space based on the reception of the backend failure information. The processor 120 may transmit the data stored in the physical storage space to the recovered backend after the recovery of the backend through the network unit 110. The physical storage space may include, for example, the disk. The concrete description of the physical storage space is just an example and the present disclosure is not limited thereto.

Hereinafter, a method for processing the read event received after the failure of the backend while the failure of the backend occurs by the processor 120 will be described.

When the type of event received from the client 400 through the network unit 110 is the read event, the processor 120 may determine to stop at least one of transmission and transformation of the data based on the read event. When the backend 210 is failed, the processor 120 may determine to stop a reception task of the event or a transformation task of the event for the read event. When the processor 120 completes only a task being processed in the middle of receiving the event or transforming the event, the processor 120 may determine to stop the reception or transformation task of the event, which is performed by the processor 120.

The streaming event may be an event in which data for writing is input in real time and the corresponding data may be lost when the data input in real time may not be stored. Accordingly, the processor 120 may store the data based on the streaming event in the physical storage space and then, transmits to the recovered backend the data stored in the physical storage space through the network unit 110 after the backend 210 is recovered in order to prevent data from being lost.

On the other hand, the read event is an event for reading the data stored in the database and there is no risk of data being lost even if the event is not processed in real time. In the case of the read event, since a loss problem of data does not occur even though the processing of the data based on the read event is performed after waiting until the backend 210 is recovered, it may be determined that the reception or transformation task of the event in the processing 120 is stopped. After the backend is recovered, the processor 120 may perform the task again in order to process the event received from the client 400.

Hereinafter, a method for processing the read event while the failure of the backend occurs when the backend is failed in the middle of the processing of the read event by the processor 120 will be described.

The processor 120 may identify one or more backends 200 for processing the read event when receiving the read event through the network unit 110. The processor 120 may store in the memory 130 information regarding the read event and information regarding one or more backends 200 for processing the read event. The processor 120 may store the information based on the read event in the buffer 150 and then, transmit a request based on the data to one or more backends for processing the read event.

After the processor 120 transmits the data read request based on the read event to one or more backends, the processor 120 may receive from the frontend 300 the backend failure information for at least one backend among the one or more backends 200. The processor 120 may not receive the processing completion information for the data read request from the failed backend 210 as the backend 210 is failed. Since the processor 120 may not receive the processing completion information for the data read request, the processor 120 may not delete the information related to the read event from the memory 130. Accordingly, the memory 130 may continue to store information regarding the read event when the backend 210 is failed during the processing of the read event.

The processor 120 may transmit the data read request based on the read event corresponding to the recovered backend to the recovered backend when receiving the recovery information indicating that the failed backend 210 is recovered from the frontend 300.

Hereinafter, an operation of the processor 120 based on the recovered backend after recovery of the failed backend will be described.

The processor 120 may receive the recovery information of the failed backend through the network unit 110. The processor 120 may receive the recovery information for the backend from the frontend 300. The processor 120 may establish a connection with at least one backend among the one or more backends. The processor 120 may establish a connection with the recovered backend.

The processor 120 may transmit the data based on the streaming event stored in the physical storage space to the recovered backend through the network unit 110 based on the establishment of the connection with the recovered backend.

The processor 120 may transmit the data based on the read event to the recovered backend through the network unit 110 based on the establishment of the connection with the recovered backend.

The processor 120 may process the event received from the client after receiving the recovery information for the backend. The processor 120 may process the event based on the connection with the recovered backend.

The processor 120 may transmit data load request information to at least one backend among the one or more backends based on the event received from the client. The data load request information may include information for reading/writing data. The processor 120 may store in the memory 130 at least one of the data load request information and information regarding at least one backend 200 transmitting the data load request. When the processor 120 receives the processing completion information based on the data load request information from at least one backend 200 transmitting the data load request information, the processor 120 may delete at least one of the data load request information and the information regarding at least one backend 200 transmitting the data load request from the memory 130.

Figure 4:
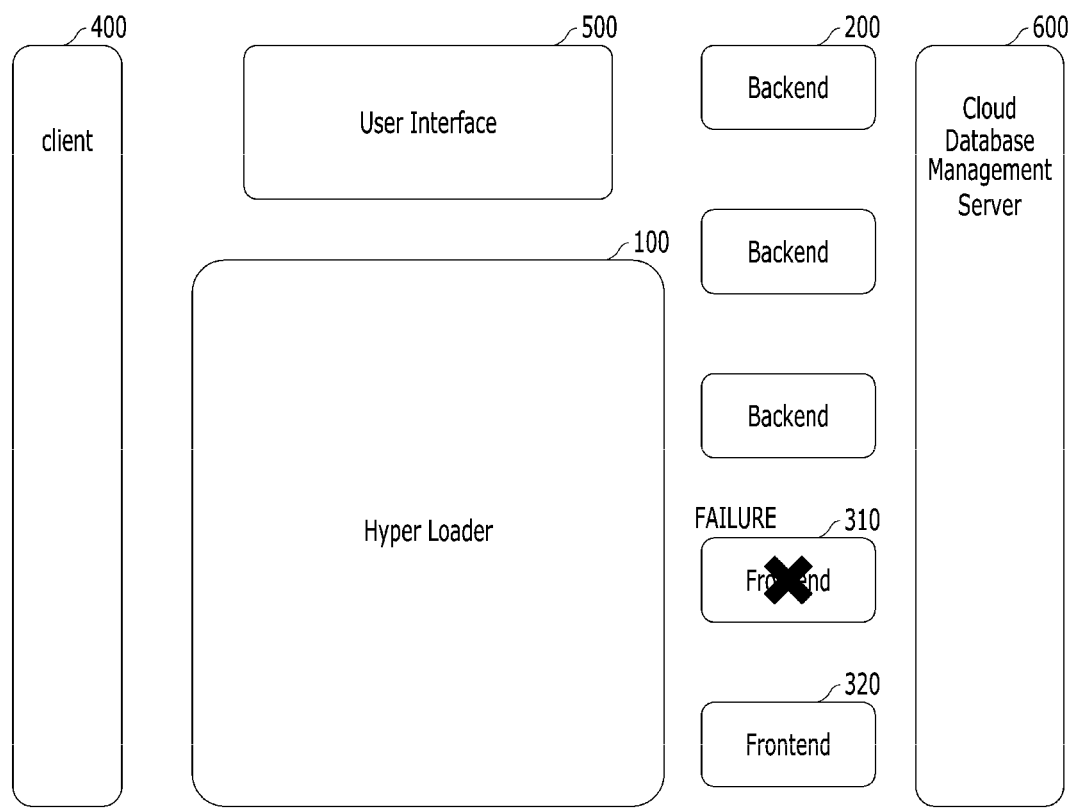
FIG. 4 is a diagram illustrating an example of a system in a failure of a frontend according to an exemplary embodiment of the present disclosure.

Hereinafter, an operation of the hyper loader 100 for processing the event in the failure of the backend 310 will be described with reference to FIG. 4.

The processor 120 may receive a frontend list including information regarding the one or more frontends 300 from one frontend among one or more frontends 300 through the network unit 110. The processor 120 may receive a frontend list including information regarding one or more frontends 300 from the frontend 300 connected with the hyper loader 100 through the network unit 110. The frontend list may include the information regarding one or more frontends 300. The frontend list may include information regarding the addresses of one or more frontends 300. The information regarding one or more frontends 300 may include information regarding another frontend 320 which may perform the task instead of the failed frontend 310 when the frontend 310 connected with the hyper loader 100 is failed.

When at least one frontend 310 is failed among the one or more frontends 300, the processor 120 may establish a connection with another frontend 320 other than the failed frontend 310 based on the frontend list. The processor 120 may cut the connection with the backend 200 which is connected based on the failed frontend 310.

The processor 120 may establish a connection with at least one backend 200 among the one or more backends based on the connection with the another frontend 320. The processor 120 may perform the connection with another frontend 320 and may receive the backend list from another frontend 320 through the network unit 110 again.

The processor 120 may determine the processing method of the event received from the client 400 while the failure of the frontend occurs until establishing the connection with at least one backend among the one or more backends 200 since the at least one frontend 310 is failed. The processor 120 may determine the processing method of the event received from the client 400 while the failure of the frontend occurs until establishing the connection with at least one backend among the one or more backends 200 based on the establishment of the connection with another frontend 320 after establishing the connection with another frontend 320 since the frontend 310 is failed. The event may be the streaming event for storing data or the read event for reading data included in the backend. The processor 120 may determine the processing method while the failure of the frontend occurs based on the type of event.

Hereinafter, a method for processing the streaming event received after the failure of the frontend 310 while the failure of the frontend occurs by the processor 120 will be described. A method for processing the streaming event received until establishing the connection with at least one backend among one or more backends 200 since the failure of the frontend 310 while the failure of the frontend occurs by the processor 120 will be described.

The processor 120 may determine to store the data based on the event in the physical storage space when the type of event is the streaming event. The physical storage space may include, for example, the disk. The concrete description of the physical storage space is just an example and the present disclosure is not limited thereto.

The processor 120 may establish the connection with another frontend 320, establish the connection with at least one backend among the one or more backends 200 based on the establishment of the connection with the another frontend 320 and then, transmit the data based on the event stored in the physical storage space to the backend for processing the event.

Hereinafter, a method for processing the read event received after the failure of the frontend 310 while the failure of the frontend occurs by the processor 120 will be described.

When the type of event in which the processor 120 receives from the client 400 through the network unit 110 until establishing the connection with at least one backend among one or more backends 200 after the failure of the frontend 310 is the read event for reading data included in at least one backend among the one or more backends 200, the processor 120 may determine to perform the processing of the read event again after establishing the connection with at least one backend among the one or more backends 200. When the type of event is the read event, the processor 120 may read unavailable data since the failure of the frontend 310 through the backend 200. Accordingly, the processor 120 may determine to read the data based on the read event in the backend 200 again after establishing the connection with another frontend 320 based on the frontend list in order to read available data.

The processor 120 may determine to perform processing for the read event based on data since a recent storage timing of one or more backends 200 in order to perform the processing for the read event again. The processor 120 may determine to perform the processing for the read event again based on data since a recent storage timing of changed data in one or more backends 200. The processor 120 may determine to read data after a reception timing of storage completion information which is most recently received from the frontend 300 again in the backend 200.

When the frontend is failed, a connection with a new another frontend may be established immediately unlike the case where the backend is failed. Further, when the frontend is failed, since a connection with another frontend is newly established unlike the recovery of the backend, a recovery time is short. Further, when only the frontend is failed and the backend is not failed, the processing for the read event is available, but the processor 120 may read wrong data. Accordingly, the processor 120 may establish the connection with another frontend again and thus establish the connection with the backend and then, read the data after the recent storage timing for the changed data in the backend again.

Figure 5:
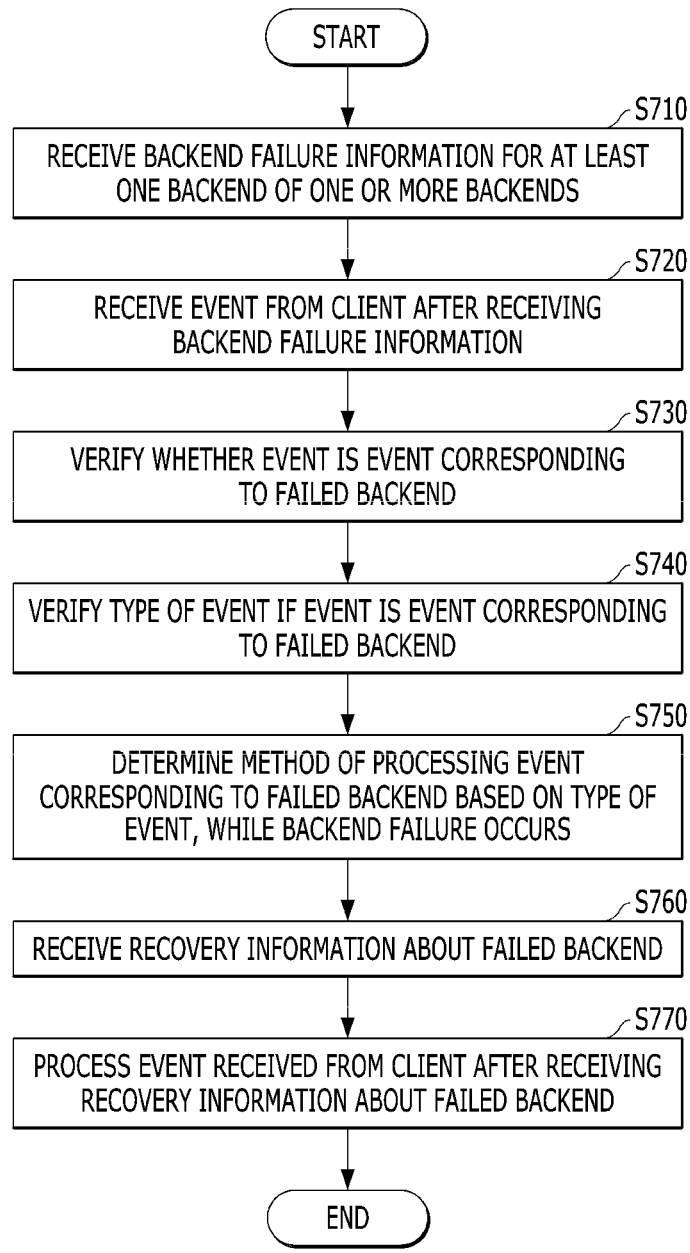
FIG. 5 is a flowchart for processing an event in a failure of a frontend in a system.

FIG. 5 is a flowchart for processing an event in a failure of a frontend in a system.

A hyper loader 100 may receive a backend failure information for at least one backend of one or more backends (S710). The hyper loader 100 may receive an event from a client after receiving the backend failure information (S720). The hyper loader 100 may verify whether the event is an event corresponding to a failed backend (S730).

The hyper loader 100 may verify a type of event if the event is an event corresponding to a failed backend (S740). The hyper loader 100 may determine a method of processing the event corresponding to the failed backend based on the type of event, while backend failure occurs (S750). The hyper loader 100 may determine to store data based on the event in a physical storage space when the type of event is a streaming event. The hyper loader 100 may determine to stop at least one of transmission and transformation of data based on a read event when the type of event is the read event.

The hyper loader 100 may receive recovery information regarding the failed backend (S760). The hyper loader 100 may establish a connection with at least one backend among the one or more backends. When the type of event is the streaming event, the hyper loader 100 may transmit the data based on the event stored in the physical storage space to the recovered backend after recovery of the failed backend.

The hyper loader 100 may process the event received from the client after receiving the recovery information for the backend (S770). The hyper loader 100 may transmit data load request information to at least one backend among the one or more backends based on the event received from the client. The hyper loader 100 may store in a buffer at least one of the data load request information and information regarding at least one backend transmitting the data load request. When the hyper loader 100 receives the processing completion information based on the data load request information from at least one backend transmitting the data load request information, the processor may delete at least one of the data load request information and the information regarding at least one backend transmitting the data load request from the buffer.

Figure 6:
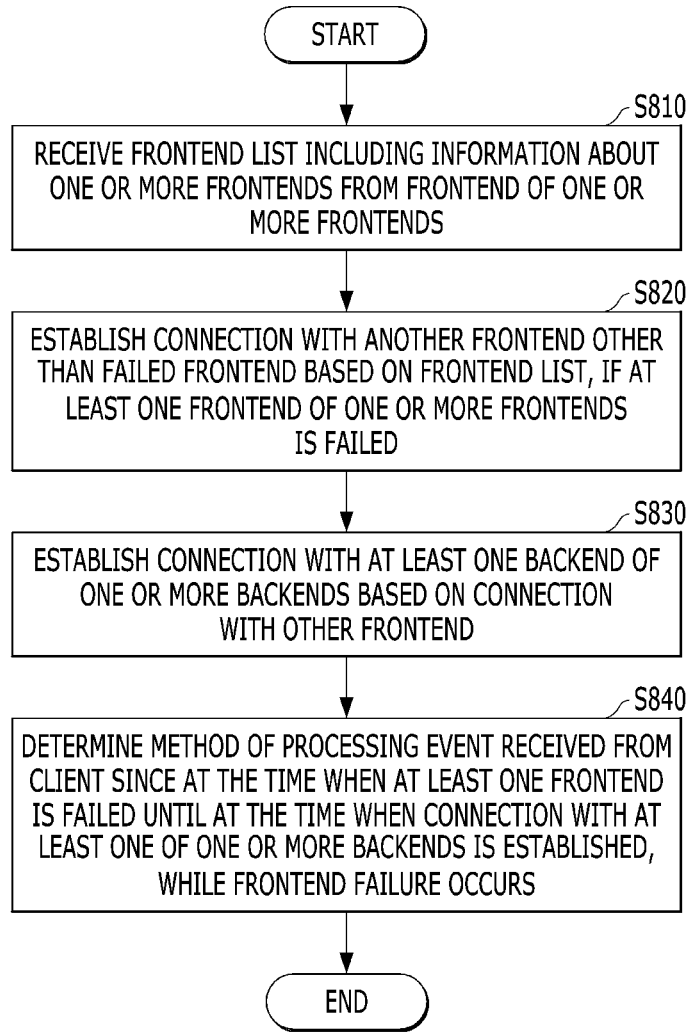
FIG. 6 is a flowchart for processing an event in a failure of a backend in a system.

FIG. 6 is a flowchart for processing an event in a failure of a backend in a system.

The hyper loader 100 may receive a frontend list including information about one or more frontends from a frontend of one or more frontends (S810).

The hyper loader 100 may establish a connection with another frontend other than a failed frontend based on the frontend list, if at least one frontend of the one or more frontends is failed (S820).

The hyper loader 100 may establish a connection with at least one backend of one or more backends based on a connection with the other frontend (S830).

The hyper loader 100 may determine a method of processing an event received from a client since at the time when at least one frontend is failed until when connection with at least one of the one or more backends is established, while frontend failure occurs (S840).

The hyper loader 100 may determine to store the data based on the event in the physical storage space when the type of event is a streaming event. The hyper loader 100 may transmit the data based on the event stored in the physical storage space to a backend in which the event is to be processed, after establishing the connection with at least one backend of the one or more backends.

The hyper loader 100 may determine to perform the processing for a read event again after establishing a connection with at least one backend of the one or more backends, if a type of event is the read event for reading data included in at least one backend of the one or more backends. The hyper loader 100 may determine to perform processing for the read event based on a data after a last storage time of the one or more backends.

Figure 7:
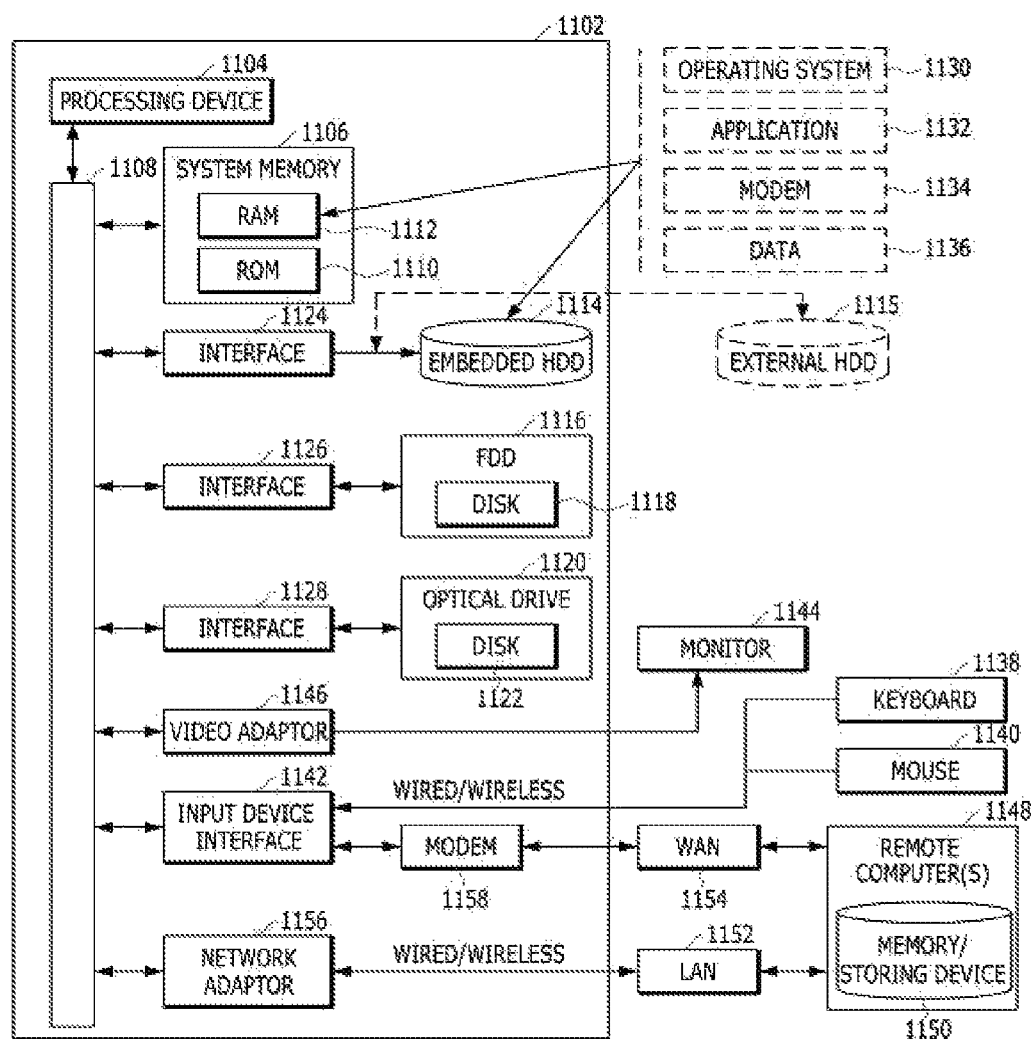
FIG. 7 is a block diagram of a computing device according to an exemplary embodiment of the present disclosure.

FIG. 7 is a block diagram of a computing device according to an exemplary embodiment of the present disclosure.

FIG. 7 illustrates a simple and general schematic view of an exemplary computing environment in which the exemplary embodiments of the present disclosure may be implemented.

The present disclosure has generally been described above in association with a computer executable instruction which may be executed on one or more computers, but it will be well appreciated by those skilled in the art that the present disclosure can be implemented through a combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof. The computer readable media include volatile and non-volatile media, transitory and non-transitory media, and mobile and non-mobile media. As not a limit but an example, the computer readable media may include both computer readable storage media and computer readable transmission media. The computer readable storage media include volatile and non-volatile media, temporary and non-temporary media, and movable and non-movable media implemented by a predetermined method or technology for storing information such as a computer readable instruction, a data structure, a program module, or other data. The computer storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a modulated data signal such as other transport mechanism and include all information transfer media. The term "modulated data signal" means a signal acquired by configuring or changing at least one of characteristics of the signal so as to encode information in the signal. As not a limit but an example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an internal hard disk drive (HDD) 1114 (for example, EIDE and SATA)—the internal hard disk drive (HDD) 1114 may also be configured for an external purpose in an appropriate chassis (not illustrated)-, a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached by the RAM 1112. It will be well appreciated that the present disclosure may be implemented in various operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer (s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and a Bluetooth wireless technology. Accordingly, communication may be a predefined structure like the network in the related art or just ad hoc communication between at least two devices.

The Wi-Fi enables connection to the Internet, and the like without a wired cable. The Wi-Fi is a wireless technology such a device, for example, a cellular phone which enables the computer to transmit and receive data indoors or outdoors, that is, anywhere in a communication range of a base station. The Wi-Fi network uses a wireless technology called IEEE 802.11 (a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Further, various exemplary embodiments presented herein may be implemented as manufactured articles using a method, an apparatus, or a standard programming and/or engineering technique. The term "manufactured article" includes computer programs or media which are accessible by a predetermined computer-readable device. For example, a computer readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

The description of the presented embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein, but should be analyzed within the widest range which is consistent with the principles and new features presented herein.

What is claimed is:

1. A non-transitory computer readable medium storing a computer program, wherein when the computer program is executed by one or more processors of a server for database failure management, the computer program performs procedures for database failure management via the server, and the procedures include:
   receiving a backend failure information for at least one backend of one or more backend computing devices;
   receiving a request from a client computing device via a network after receiving the backend failure information;
   verifying whether the request is a request corresponding to a failed backend based on a backend list received from a frontend computing device;
   verifying a type of the request if the request is a request corresponding to a failed backend;
   determining a method of processing the request corresponding to the failed backend based on the type of the request, while backend failure occurs;
   receiving a recovery information about the failed backend; and
   processing the request received from the client computing device after receiving the recovery information about the failed backend.

2. The non-transitory computer readable medium according to claim 1, wherein types of the request include a streaming event for storing data or a read event for reading data included in a backend.

3. The non-transitory computer readable medium according to claim 1, wherein, if the type of the request is a streaming event,
   the determining a method of processing the request corresponding to the failed backend based on the type of the request, while backend failure occurs, includes:
   determining to store a data based on the request in a physical storage space; and
   wherein the procedures further include:
   transmitting the stored data based on the request in the physical storage space to a recovered backend after recovery of the failed backend.

4. The non-transitory computer readable medium according to claim 1, wherein, if the type of the request is a read event,
   the determining a method of processing the request corresponding to the failed backend based on the type of the request, while backend failure occurs, includes:
   determining to stop at least one of transmission or conversion of a data based on the read event.

5. The non-transitory computer readable medium according to claim 1, wherein the processing a request received from the client computing device after receiving the recovery information about the failed backend includes:
   establishing a connection with at least one backend of the one or more backend computing devices.

6. The non-transitory computer readable medium according to claim 1, wherein the procedures further include:
   transmitting a data load request information to at least one backend of the one or more backend computing devices based on the request received from the client computing device;
   storing at least one of the data load request information or information about at least one backend that has received the data load request information in a buffer; and
   if a process completion information is received based on the data load request information from at least one backend that has received the data load request information, deleting at least one of the data load request information or information about at least one backend that has received the data load request information from the buffer.

7. A non-transitory computer readable medium storing a computer program, wherein when the computer program is executed by one or more processors of a server for database failure management, the computer program performs procedures for database failure management, and the procedures include:
   receiving a frontend list including information about one or more frontends from a frontend of one or more frontend computing devices, via a network;
   establishing a connection with an other frontend other than a failed frontend based on the frontend list, if at least one frontend of the one or more frontends is failed;
   establishing a connection with at least one backend of one or more backend computing devices based on a connection with the other frontend; and
   determining a method of processing a request received from a client computing device via the network since when at least one frontend is failed until when connection with at least one of the one or more backends is established, while frontend failure occurs.

8. The non-transitory computer readable medium according to claim 7, wherein the determining a method of processing an event received from a client computing device since when at least one frontend is failed until when connection with at least one of the one or more backends is established, while frontend failure occurs, includes:
   determining to store a data based on the request in a physical storage space, if the event is a streaming event.

9. The non-transitory computer readable medium according to claim 8, wherein procedures further include:
   transmitting the data based on the request stored in the physical storage space to a backend in which the event is to be processed, after establishing the connection with at least one backend of the one or more backend computing devices.

10. The non-transitory computer readable medium according to claim 7, wherein the procedures further include:
    determining to perform a processing for a read event again after establishing a connection with at least one backend of the one or more backend computing devices, if a type of the request is the read event for reading data included in at least one backend of the one or more backend computing devices.

11. The non-transitory computer readable medium according to claim 10, wherein the determining to perform the processing for a read event again after establishing a connection with at least one of the one or more backend computing devices includes:

determining to perform processing for a read event based on a data after a last storage time of the one or more backend computing devices.

12. A method for database failure management performed by a server for database failure management, comprising:
receiving a backend failure information for at least one of one or more backend computing devices;
receiving a request from a client computing device via a network after receiving the backend failure information;
verifying whether the request is a request corresponding to a failed backend based on a backend list received from a frontend computing device;
verifying a type of the request if the request is a request corresponding to a failed backend;
determining a method of processing the request corresponding to the failed backend based on the type of the request, while backend failure occurs;
receiving a recovery information about the failed backend; and
processing the request received from the client computing device after receiving the recovery information about the failed backend.

13. A server for database failure management, comprising:
a processor including one or more cores; and
a memory;
wherein the processor is configured to
receive a backend failure information for at least one of a one or more backend computing devices;
receive a request from a client computing device via a network after receiving the backend failure information;
verify whether the request is a request corresponding to a failed backend based on a backend list received from a frontend computing device;
verify a type of the request if the request is a request corresponding to a failed backend;
determine a method of processing the request corresponding to the failed backend based on the type of the request, while backend failure occurs;
receive a recovery information about the failed backend; and
process a request received from the client computing device after receiving the recovery information about the failed backend.

14. A method for database failure management performed by a server for database failure management, comprising:
receiving a frontend list including information about one or more frontends from one frontend of one or more frontend computing devices via a network;
establishing a connection with an other frontend other than a failed frontend based on the frontend list, if at least one frontend of the one or more frontends is failed;
establishing a connection with at least one backend of one or more backend computing devices based on a connection with the other frontend; and
determining a method of processing a request received from a client computing device since when at least one frontend is failed until when connection with at least one of the one or more backend computing devices is established; while frontend failure occurs.

15. A server for database failure management, comprising:
a processor including one or more cores; and
a memory;
wherein the processor is configured to
receive a frontend list including information about one or more frontends from one frontend of one or more frontend computing devices via a network;
establish a connection with an other frontend other than a failed frontend based on the frontend list, if at least one frontend of the one or more frontend computing devices is failed;
establish a connection with at least one backend of one or more backend computing devices based on a connection with the other frontend; and
determine a method of processing an event received from a client computing device since when at least one frontend is failed until when connection with at least one of the one or more backend computing devices is established, while frontend failure occurs.

* * * * *